United States Patent (10) Patent No.: US 7,600,396 B2
Mak (45) Date of Patent: Oct. 13, 2009

(54) POWER CYCLE WITH LIQUEFIED NATURAL GAS REGASIFICATION

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 423 days.

(21) Appl. No.: 10/559,171

(22) PCT Filed: Aug. 26, 2003

(86) PCT No.: PCT/US03/26805

§ 371 (c)(1),
(2), (4) Date: Jun. 27, 2006

(87) PCT Pub. No.: WO2004/109180

PCT Pub. Date: Dec. 16, 2004

(65) Prior Publication Data

US 2007/0101732 A1    May 10, 2007

Related U.S. Application Data

(60) Provisional application No. 60/476,770, filed on Jun. 5, 2003.

(51) Int. Cl.
*F25J 3/00* (2006.01)
*F17C 9/02* (2006.01)
(52) U.S. Cl. .......................... 62/620; 62/50.2
(58) Field of Classification Search ............. 62/50.2, 62/620
See application file for complete search history.

(56) References Cited

U.S. PATENT DOCUMENTS

| | | | | |
|---|---|---|---|---|
| 2,952,984 | A | * | 9/1960 | Marshall, Jr. ............... 62/622 |
| 3,724,229 | A | | 4/1973 | Seliber ......................... 62/52 |
| 4,036,028 | A | | 7/1977 | Mandrin ....................... 62/52 |
| 4,231,226 | A | | 11/1980 | Gnepentrog ................. 60/648 |
| 4,429,536 | A | | 2/1984 | Nozawa ....................... 60/655 |
| 5,114,451 | A | * | 5/1992 | Rambo et al. ................ 62/623 |
| 5,295,350 | A | | 3/1994 | Child et al. .................. 60/780 |
| 5,394,686 | A | | 3/1995 | Child et al. .................. 60/780 |
| 5,890,377 | A | | 4/1999 | Foglietta ..................... 62/621 |
| 6,125,653 | A | * | 10/2000 | Shu et al. .................... 62/622 |
| 6,758,060 | B2 | * | 7/2004 | O'Brien ...................... 62/631 |
| 6,964,181 | B1 | * | 11/2005 | Milios et al. ................ 62/620 |
| 2003/0005698 | A1 | | 1/2003 | Keller ......................... 60/643 |
| 2003/0188996 | A1 | * | 10/2003 | Reddick et al. ............ 208/340 |

FOREIGN PATENT DOCUMENTS

| | | |
|---|---|---|
| EP | 0496283 | 7/1992 |
| EP | 0683847 | 2/1994 |
| WO | 02/097252 | 12/2002 |

\* cited by examiner

*Primary Examiner*—William C Doerrler
(74) *Attorney, Agent, or Firm*—Fish & associates, PC (57) ABSTRACT

Liquefied natural gas (LNG) or components thereof are used as working fluids in power generation cycles in a LNG regasification plant. Especially preferred plant configurations will be able to process LNG of different composition while generating on-spec pipeline gas, CNG, LNG vehicle fuel, and LPG.

22 Claims, 4 Drawing Sheets

Table 1 – Overall Balance of the Integrated Facility - LNG and CNG Production

| Components Mole Fraction | LNG Feed | Ethane | LPG | Pipeline Gas | CNG Motor Fuel | LNG Motor Fuel |
|---|---|---|---|---|---|---|
| $N_2$ | 0.0065 | 0.0000 | 0.0000 | 0.0073 | 0.0073 | 0.0073 |
| $C_1$ | 0.8816 | 0.0243 | 0.0000 | 0.9868 | 0.9868 | 0.9868 |
| $C_2$ | 0.0522 | 0.9657 | 0.0053 | 0.0050 | 0.0050 | 0.0050 |
| $C_3$ | 0.0328 | 0.0092 | 0.5399 | 0.0007 | 0.0007 | 0.0007 |
| $iC_4$ | 0.0071 | 0.0000 | 0.1208 | 0.0001 | 0.0001 | 0.0001 |
| $NC_4$ | 0.0107 | 0.0000 | 0.1821 | 0.0001 | 0.0001 | 0.0001 |
| $iC_5$ | 0.0040 | 0.0000 | 0.0675 | 0.0000 | 0.0000 | 0.0000 |
| $NC_5$ | 0.0020 | 0.0000 | 0.0338 | 0.0000 | 0.0000 | 0.0000 |
| $C_{6+}$ | 0.0030 | 0.0000 | 0.0507 | 0.0000 | 0.0000 | 0.0000 |
| Heat Value Btu/SCF (HHV) | 1,153 | 1,745 | 2,985 | 1000 | 1000 | 1000 |
| MMscfd | 1,200 | 59 | 70 | 1,046 | 12 | 12 |
| Std Barrel/ day | 519,900 | 37,100 | 51,000 | 421,900 | 4,900 | 5,000 |

Figure 4

POWER CYCLE WITH LIQUEFIED NATURAL GAS REGASIFICATION

This application claims the benefit of U.S. provisional patent application number with the Ser. No. 60/476,770, filed Jun. 5, 2003, and which is incorporated herein by reference.

FIELD OF THE INVENTION

The field of the invention is gas processing, especially as it relates to regasification and processing of liquefied natural gas.

BACKGROUND OF THE INVENTION

With increasing natural gas demand in the United States, import of liquefied natural gas (LNG) has gained considerable attention. However, due to the variable chemical composition of LNG from various sources, the natural gas often requires additional processing steps to meet industry and environmental standards, especially in the US market. Therefore, most imported LNG is regasified for further processing (e.g., fractionation, or dilution with nitrogen), which requires substantial amounts of energy, but also provides significant refrigeration content. Numerous processes are known that couple regasification with other processes to reduce energy consumption and/or make use of the refrigeration content in LNG.

For example, regasification of LNG can be thermally coupled with a partial oxidation plant wherein at least a portion of the regasified LNG is employed for cooling and as a fuel in the burners as described by Child et al. in U.S. Pat. Nos. 5,295,350 and 5,394,686. While in such configurations the source of waste heat is relatively limited, regasification of LNG for production of natural gas in large quantities is typically not achieved. In other examples, as described in U.S. Pat. Nos. 4,036,028 and 4,231,226 to Mandrin and Griepentrog, respectively, published U.S. patent application 2003/0005698 to Keller, EP 0683847 to Johnson et al., and WO 02/097252 to Keller, heat for regasification of LNG is provided by a heat exchange fluid, which is in thermal exchange with a turbine exhaust or combined cycle power plant. While some of these configurations provide significant reduction in energy consumption for LNG reagasification, several difficulties nevertheless remain that have limited the full utilization of the LNG refrigerant content.

Most significantly, and among other difficulties, the heat transfer is at least in some of these configurations limited by the freezing point of the heat transfer medium. Furthermore, while the refrigeration content of the LNG is utilized to at least some degree, energy is not extracted from such configurations. Interestingly, European patent application EP 0496283 describes a system in which power is generated by a steam expansion turbine that is driven by a working fluid (water) that is heated by a gas turbine exhaust and cooled by a LNG regasification circuit. While such a configuration increases efficiency of a plant at least to some degree, several problems nevertheless remain. For example, the valuable cryogenic refrigeration content of the LNG is left unused as the freezing point of water (or water glycol mixtures) is relatively high.

Therefore, while numerous processes and configurations for LNG utilization and regasification are known in the art, all of almost all of them suffer from one or more disadvantage. Thus, there is still a need to provide improved configurations and methods for LNG utilization and regasification.

SUMMARY OF THE INVENTION

The present invention is directed to configurations and methods of processing LNG in a plant in which a heat source (e.g., integral with, or thermally coupled to the plant) vaporizes pressurized LNG, which is subsequently expanded to produce work in an open power cycle. Especially preferred configurations further include a closed power cycle (preferably operating with methane as working fluid), that uses the LNG refrigeration content for condensation of the working fluid (that is preferably) produced by the separation process. Such configurations may advantageously further produce concentrated methane fuel from the power cycle for the LNG and CNG (Compressed Natural Gas) transportation fuel market.

Therefore, in one aspect of the inventive subject matter, a regasification plant will include an expander that expands a process product of the liquefied natural gas to produce work. Especially preferred process products comprise demethanizer overhead vapors, and may further include a recycle gas from a closed power cycle (most preferably having a methane concentration of at least 95 vol %). In particularly preferred plants, the demethanizer overhead vapor and the recycle vapor are liquefied in a heat exchanger using the liquefied natural gas as a refrigerant, wherein the heat exchanger is upstream of the expander. The so generated vapors are then heated and vaporized to form a superheated supercritical gas that is expanded in the expander.

Contemplated plants may further comprise a second expander that expands at least a portion of the liquefied natural gas, wherein the liquefied gas is compressed and heated in a heat source (e.g., demethanizer overhead heat exchanger, deethanizer reflux condenser, turbine combustion air intake cooler, flue gas from a gas turbine, waste heat recovery unit, air separation plant, sea water heat exchanger, and/or a fired heater) before expansion in the second expander. Furthermore, it should be recognized that a portion of the process product may be extracted from the plant as compressed natural gas, and/or a portion of the liquefied vapors may be extracted from the plant as liquefied fuel gas.

In another aspect of the inventive subject matter, a liquid natural gas regasification plant may include a demethanizer that receives natural gas and produces an overhead product gas, and a first heat exchanger that cools the product gas to produce a product liquid. It is further contemplated that in such plants a pump increases the pressure of at least a portion of the product liquid to form a pressurized product liquid, a second heat exchanger vaporizes and superheats the pressurized product liquid to form a superheated compressed product gas, and that an expander expands at least a portion of the compressed product gas to produce work. Preferably, the compressed product gas is in a superheated supercritical region.

Such plants may advantageously include a second expander that extracts work from the natural gas before the natural gas enters the demethanizer, wherein a portion of the overhead product gas is compressed to a pipeline pressure using a compressor that is operationally coupled to the second expander. In yet further preferred aspects of such configurations, the expanded compressed product gas is combined with the overhead product gas, and/or the demethanizer receives heated liquefied natural gas as demethanizer reflux, wherein the first heat exchanger heats liquefied natural gas to form the heated liquefied natural gas. Moreover, it should be recognized that a portion of the compressed product gas may be extracted from the plant as compressed natural gas, and that a portion of the product liquid may be extracted from the plant as liquefied natural gas fuel. These compressed natural gas and liquefied natural gas are of high quality containing over 99% methane which is advantageous as transportation fuels and in reducing emissions and pollutants.

Therefore, in still further contemplated aspects, a plant for regasification of liquefied natural gas may include a first expander that expands a heated and vaporized liquefied natural gas, and a second expander that expands a heated and compressed demethanizer overhead to a first pressure. An optionally third expander further expands the expanded demethanizer overhead to a second pressure below the first pressure, wherein the first, second, and optional third expanders are fluidly coupled to each other and produce work from at least a component of the liquefied natural gas. In such configurations, it is generally preferred that a first pump increases pressure of at least a portion of the liquefied natural gas, wherein the portion of the liquefied natural gas is heated by a heat source (e.g., demethanizer overhead heat exchanger, deethanizer reflux condenser, turbine combustion air intake cooler, flue gas from a gas turbine, waste heat recovery unit, air separation, sea water heat exchanger, and/or fired heater) to form the heated and vaporized liquefied natural gas. Additionally, or alternatively, a first heat exchanger in such configurations liquefies a demethanizer overhead, a second pump increases pressure of the liquefied demethanizer overhead, and a second heat exchanger heats and vaporizes the pressurized liquefied demethanizer overhead to form the heated and pressurized demethanizer overhead. The first heat exchanger preferably cools the demethanizer overhead using a liquefied natural gas feed as refrigerant, while the second heat exchanger preferably heats the pressurized liquefied demethanizer overhead using the expanded demethanizer overhead. It is still further contemplated that the first pressure is a pipeline pressure of between about 700 psi and 1500 psi, and that the second pressure is a demethanizer operating pressure of between about 300 psi and 750 psi.

Various objects, features, aspects and advantages of the present invention will become more apparent from the following detailed description of preferred embodiments of the invention, along with the accompanying drawing.

DETAILED DESCRIPTION

The inventor has discovered that LNG can be processed in a manner that effectively utilizes the refrigeration content in the LNG. More specifically, the inventor discovered that an LNG stream can be pumped to a desired, pressure and split into a first and second portion, wherein the first portion acts as a working fluid and the second portion acts as a reflux for a demethanizer. In such configurations, the LNG supplies the condensation duty in a closed methane Rankine power cycle, wherein the methane is generated from the LNG in the demethanizer.

Figure 1:
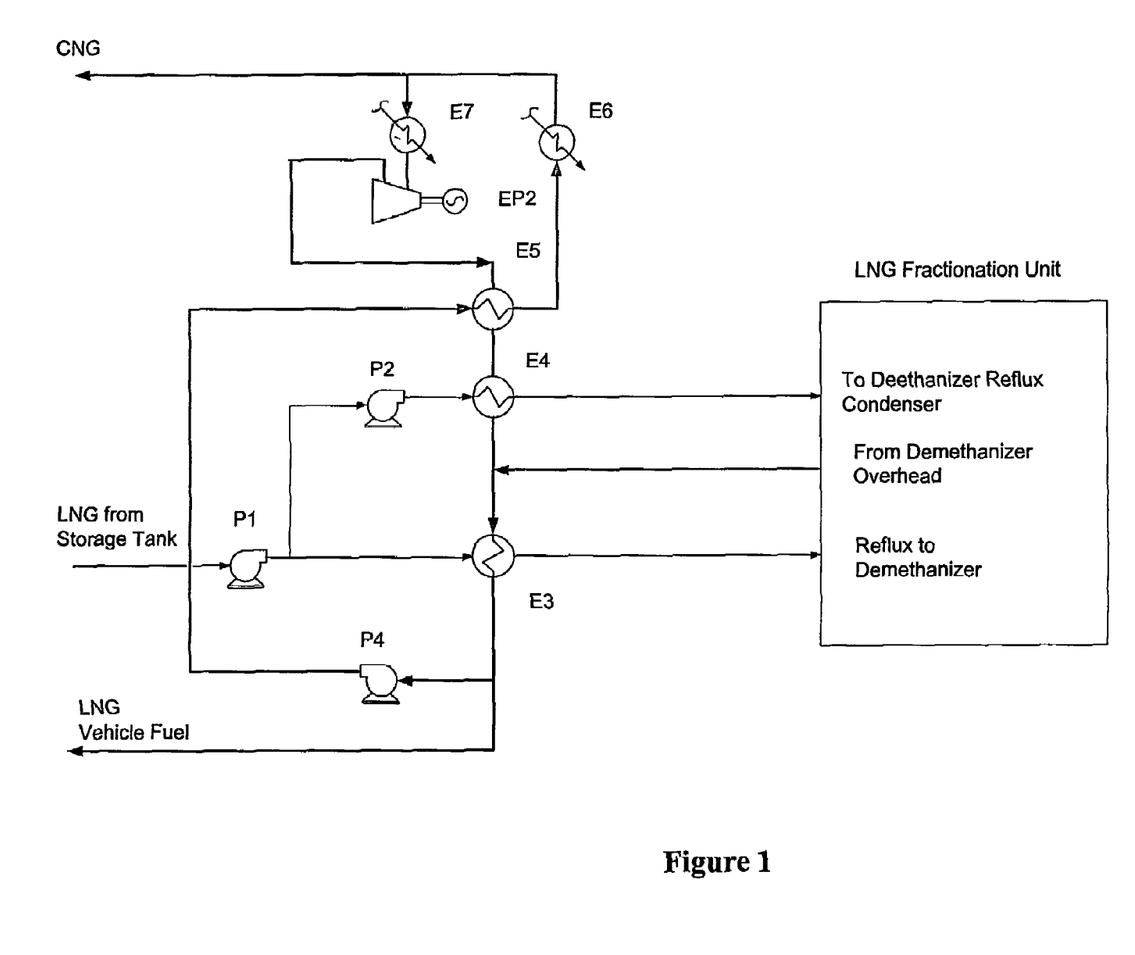
FIG. 1 is a schematic diagram of one exemplary power cycle configuration according to the inventive subject matter.

An exemplary closed power cycle is schematically depicted in FIG. 1 in which the closed power generation cycle is operationally coupled to an LNG regasification/processing plant. Here, LNG is provided as a feed to the regasification/processing plant and the refrigeration content of the LNG is used to condense the working fluid in the closed cycle (and also in power generation coupled to an combined cycle power plant-not shown).

More particularly, LNG from a storage tank or other source is pumped by pump P1 to a predetermined pressure. The so pressurized LNG is then split into a first and a second portion, which are both employed as cooling medium in heat exchangers E3 and E4, respectively (the second portion may be further pressurized by pump P2). Ultimately, both portions will be fed to the demethanizer (e.g., one portion as reflux, the other as demethanizer feed), which produces a demethanizer overhead product (pipeline gas, typically comprising between 90 vol % and 99 vol % methane). A portion of the so produced demethanizer overhead product will be employed as a working fluid which is condensed in exchanger E3, while the other portion may be sold as liquefied vehicle fuel ("LNG vehicle fuel"). The portion that acts as the working fluid is then pumped to pressure using pump P4 and vaporized in exchangers E5, E6, and/or E7. At least a portion of the so generated heated and compressed supercritical gas is then expanded in an expander turbine to generate power, while another portion may be sold as compressed fuel gas ("CNG"). The expanded gas is then cooled in exchangers E5 and E4 before combination with demethanizer overhead, thus completing the closed power generation cycle.

Figure 2:
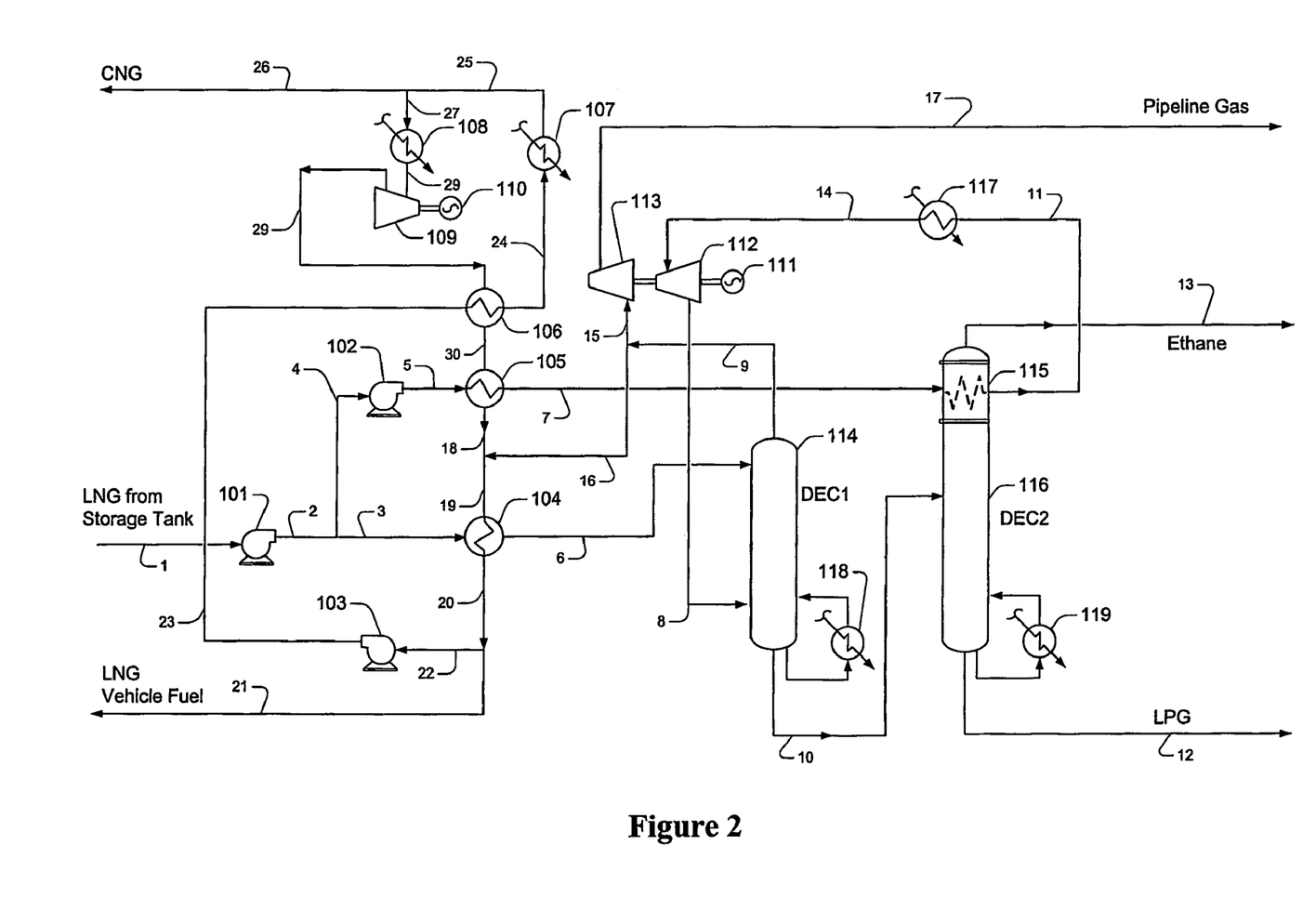
FIG. 2 is a schematic of one exemplary plant configuration according to the inventive subject matter.

FIG. 2 illustrates one exemplary configuration of a regasification plant in more detail. Here, LNG is pumped and split into two portions. The first portion is heated by supplying a portion of the condensation duty in the closed methane power cycle, and then further heated by the condensing reflux duty in a deethanizer, followed by waste heat from the combined cycle power plant for power generation in an open expander cycle. The second portion also supplies a portion of the condensation duty in the closed methane power cycle prior to be used as a cold reflux in a demethanizer.

In the exemplary configuration of FIG. 2, the LNG flow rate to the plant is equivalent to 1.2 BSCFD of natural gas with a typical gas composition shown in Table 1 below. LNG stream 1 from storage (or other suitable source) is at a pressure of about 15 psia and a temperature of typically about −260° F. to −255° F. Stream 1 is pumped by LNG pump 101 to a suitable pressure, typically about 400 to 500 psig to form pressurized LNG stream 2, as needed to enter the demethanizer 114. Pressurized LNG stream 2 is then split into stream 4 and stream 3, preferably at a ratio between 0.4 to 0.7. (The term "ratio" refers to the volume flow of stream 4 divided by the volume flow of stream 3) Stream 3 is heated in exchanger 104 to typically −210° F. to −180° F., supplying the refrigeration duty to condense the methane vapor stream 19 forming liquid stream 20, in a closed loop methane Rankine cycle. As used herein, the term "about" in conjunction with a numeral refers to a range of that numeral starting from 10% below the absolute of the numeral to 10% above the absolute of the numeral, inclusive. For example, the term "about 100 psi" refers to a range of 90 psi to 110 psi.

It should be appreciated that a higher flow ratio on stream 3 will increase the reflux to the demethanizer 114 and increase the removal of the $C_2$+ components. For example for a split ratio of 0.5 to 0.6, the removal levels are about 90% for ethane and about 99% for propane. When the split ratio is lowered to 0.4 to 0.5, the removal level is correspondingly lowered to 10% to 50% for ethane. The changes in reflux ratios will typically have only minor impact on the propane recovery that can be maintained at the 90% or higher levels and is desirable, as the liquefied petroleum gas is a more valuable product.

Thus, it should be recognized that by varying the split ratio, the quantity of $C_2+$ components in the sales gas could be controlled to meet specific market requirements. While split ratios between 0.4 and 0.7 are generally preferred, suitable split ratios also include 0.3 to 0.39, and 0.71 to 0.9.

Stream 4 is flither pumped in pump 102 to about 2000 psig to 3000 psig (supercritical region) forming stream 5, and heated in several steps. Stream 5 is heated in exchanger 105 to form stream 7, typically at −210° F. to −180° F., supplying the refrigeration duty to cool the methane vapor stream 30 to the partially condensed stream 18, in a closed loop methane Rankine cycle. Stream 7 is further heated to form stream 11, typically at −80° F. to −50° F. by providing the necessary reflux cooling in the deethanizer overhead condenser 115. Stream 11 is still further heated to typically 150° F. to 350° F., in exchanger 117 forming stream 14, using waste heat from the combined cycle power plant (waste heat preferably includes flue gas, waste heat recovery unit, combustion turbine air intake air, etc.). The high-pressure supercritical heated natural gas stream is then expanded in expander 112. A portion of the expander power may be used to drive the residue gas compressor 113, and excess power is used to generate electric power in generator 111.

The expander outlet stream 8 at 40° F. to 40° F. is fed into demethanzier 114 operating at 400 psig to 500 psigs. It should be especially noted that stream 8 supplies at least a portion, if not all of the reboiler heat required by the deinethanizer. The reflux duty for demethanzier 114 is provided by stream 6. It should be especially noted that such reflux/stripping configurations are self-contained and typically do not require any fuel consumption. However, where desired, a bottom reboiler 118 can be used to supplement the heating requirement (e.g., using waste heat from the combined cycle facility).

The bottom product stream 10 from demethanizer 114 is sent to deethanizer 116 where the overhead reflux duty is supplied in overhead condenser 115 using LNG stream 7 as a coolant. Overhead condenser 115 is preferably an integral condenser that is designed to provide an internal reflux to the deethanizer. The deethanizer overhead stream is cooled with LNG to typically 0° F. to 40° F. It should be noted that an integral exchanger will eliminate an external exchanger, separator, and pumps used in conventional system, and therefore significantly reduce the plot layout and equipment cost. The deethanizer is reboiled in reboiler 119 (preferably using waste heat from the combined cycle), producing a $C_3+$ bottom product with the desired ethane to propane ratio at typically about 150° F. to 250° F. This stream 12 can be sold as a liquid product ("LPG"). The deethanizer produces an overhead ethane stream 13 that may be used as feedstock to a petrochemical plant, or a fuel gas.

Demethanizer overhead 9, at about −120° F. and 450 psig, is split into stream 15 and stream 16, with stream 15 being compressed by compressor 113 to form stream 17, typically at pipeline pressure. Stream 16, at a typical flow rate of 24 MMscfd (or at a flow rate as required by the transportation fuel market) enters the methane power cycle by combining with stream 18 in the closed loop Rankine cycle forming stream 19 which is subsequently cooled and completely condensed in exchanger 104 forming stream 20, at about −150° F. Stream 21, at about 12 MMscfd, or an equivalent of about 200,000 gallons per day of LNG vehicle fuel may be split off at this point and sold to outside the facility.

The remaining flow, stream 22, typically at about 500 MMscfd is pumped by the power cycle pump 103 to about 2,000 to 3,000 psig at about −150° F. forming stream 23 which is further heated in exchanger 106 with heat supplied from the expander 109 outlet stream 29. So generated stream 24 is further heated using waste heat from the combined cycle power plant in exchanger 107 forming stream 25. Stream 26, at about 12 MMscfd of high-pressure natural gas may be withdrawn from this location to meet the CNG vehicle fuel demand. The majority of the vapor (stream 27) is further superheated in exchanger 108 to about 300° F. forming stream 29 using the waste heating system. The high-pressure and high-temperature supercritical methane is then expanded across the expander 109, generating electric power with generator 110. The expander discharge stream 29, at 120° F. is then cooled in exchanger 106 with the incoming cold vapor, and partially condensed in exchanger 105 utilizing the LNG refrigerant content from LNG pump 102. This two-phase mixture is then mixed with the split flow from the demethanizer overhead, and the cycle is repeated.

In this exemplary configuration, about 22,000 kW is generated in the open cycle when the high-pressure high-temperature supercritical natural gas is expanded to about 400 to 500 psig. About 50% of the power is used to drive the residue gas compressor 113 that is required to compress the demethanizer overhead from 440 to 490 psig, to about 1100 psig (typical pipeline pressure). The excess 11,000 kW can be used to generate power in generator 111 for internal use and/or for export. It should be appreciated that in all or almost all of such configurations, the closed loop methane power cycle does not require any fuel consumption other than waste heat from the power plant as the heat source. The net power production from the closed power cycle is about 15,000 kW. Thus, the total power generation from the open loop and the closed power cycles is about 26,000 kW.

The overall mass balance of a 1,200 MMscfd LNG fractionation process is shown in Table 1 (see Examples). In addition to the LNG and CNG production, this process produces 37,100 barrel per day of ethane product, 51,000 barrel per day of LPG product and 1,046 MMscfd of lean gas for the sales gas pipeline.

Figure 3:
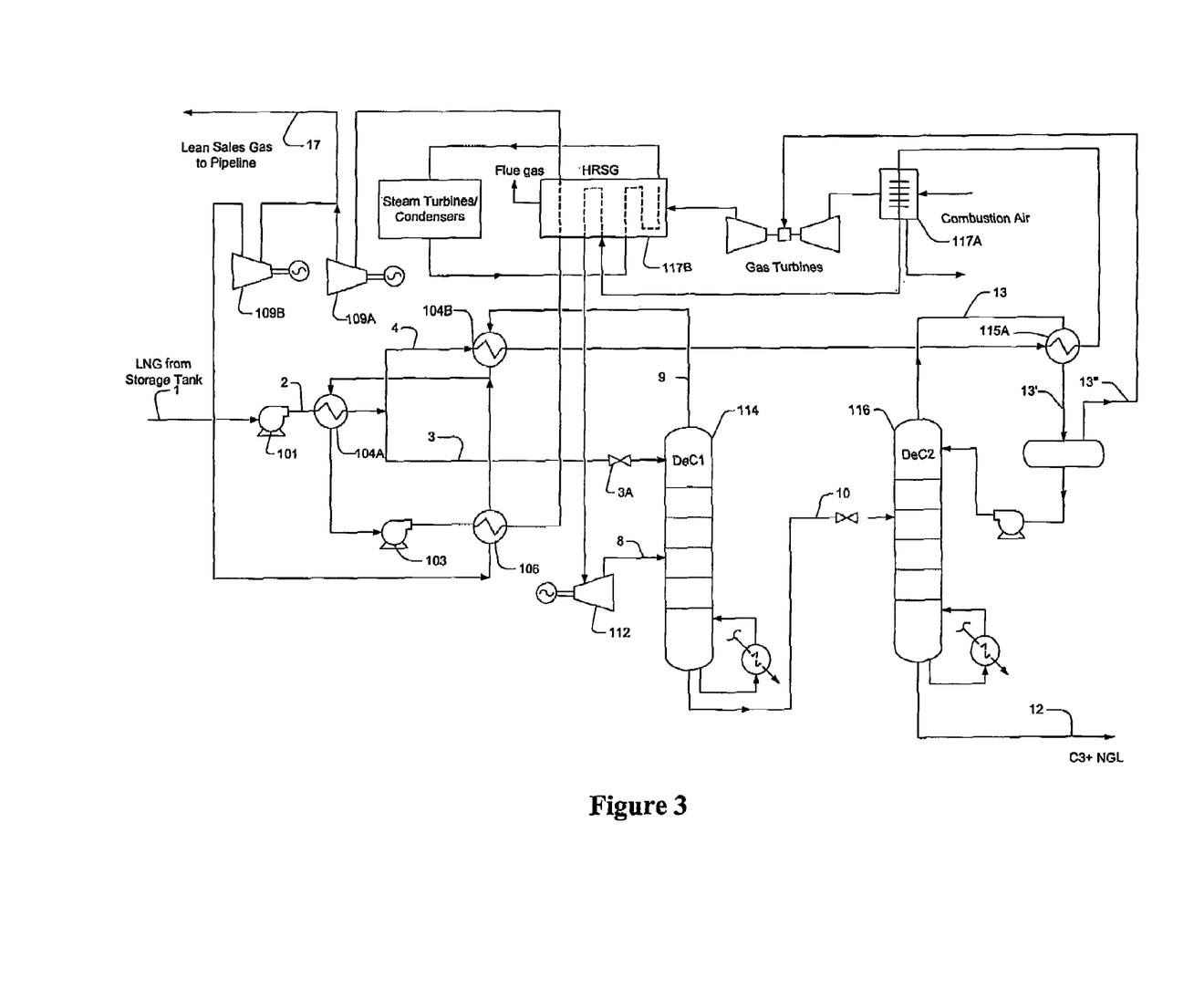
FIG. 3 is a schematic of another exemplary plant configuration according to the inventive subject matter.

Alternatively, where direct heat integration of a combined cycle power plant (in contrast to configuration of FIG. 2, where heat integration is via exchangers 107 and 117) and use of a second power generating expander in the closed cycle is desired, and exemplary configuration according to FIG. 3 may be employed in which like numerals depict like components of the configuration as depicted in FIG. 2.

Here, LNG stream 1 from storage (or other suitable source) is at a pressure of about 15 psia and a temperature of typically about −260° F. to −255° F. Stream 1 is pumped by LNG pump 101 to a pressure above pipeline pressure (typically about 1500 to 3000 psig) to form pressurized LNG stream 2, which serves as a refrigerant in exchanger 104A to at least partially condense demethanizer overhead stream 9 that is combined with methane working fluid from the closed power cycle. Pressurized LNG stream 2 is then split into stream 4 and stream 3, preferably at a ratio between 0.4 to 0.7. Stream 3 is let down in pressure to demethanizer operating pressure (typically between about 350 psig to about 500 psig, preferably using JT valve 3A) and then fed to the demethanizer 114 as demethanizer reflux. Stream 4 is used as refrigerant in various exchangers: Stream 4 in exchanger 104B cools the demethanizer overhead, and further provides the deethanizer overhead condenser duty (in exchanger 115A) before cooling the combustion turbine intake air in cooler 117A and heat recovery unit 117B. The so heated, compressed and vaporized LNG is then expanded in expander 112 to produce work (preferably electric energy using a generator) and introduced as stream 8 at about demethanizer pressure into the demethanizer 114.

It should be recognized that in such configurations expander 112 in the open power cycle will typically provide a greater power output as compared to the configuration of FIG. 2 due to the significantly higher pressure of stream 4 before entering the expander. Generation of higher pressures in the closed power cycle may be performed similarly as also shown in FIG. 3. Here, pump 103 will increase the pressure of the condensed demethanizer overhead and methane workdng fluid to a pressure above pipeline pressure (e.g., between about 1500 psig and 3000 psig), which is then heated and vaporized in exchanger 106 (e.g., using the heat in the expanded working fluid) and HRSG 117B. Expansion of the so generated high pressure methane vapor in expander 109A may be employed to produce work and optionally to bring the methane product to pipeline pressure. At least a portion of the so generated lean natural gas may then be sold as a product 17. The remaining working fluid (now as a vapor) may then be further expanded in expander 109B (preferably to about demethanizer pressure) and combined with the demethanizer overhead, thus completing the closed cycle loop.

Similar to the configuration of FIG. 2, deethanizer 116 receives demethanizer bottom product 10 and produces an ethane overhead product 13 which is at least partially condensed in the deethanizer overhead condenser (with cooling duty provided by the LNG). The liquid portion in stream 13' will then be fed to the deethanizer as reflux, while the vapor portion 13" may serve as fuel for the gas turbines in a combined cycle power plant that is thermally coupled to the regasification plant. Deethanizer bottom product 12 may be sold as a commodity as LPG (Liquefied Petroleum Gas).

Thus, it should be recognized that contemplated plants employ LNG, or a fraction thereof, as a working fluid in at least one of, and more preferably both, an open power cycle and a closed power cycle. Suitable heat sources especially include gas turbine combustion air, cooling water to the surface condenser, and/or flue gas from a gas turbine. However, numerous other heat sources are also contemplated, and it should be appreciated that units other than a combined cycle plant are also considered appropriate as a heat source. For example, suitable alternative heat sources include numerous cryogenic processes (e.g., air separation plants) in which the LNG cools the air or other gas, processes providing flue gas (e.g. combustion turbines, reformer flue gases, etc.), and other processes acting as a cold sink (e.g., carbon dioxide liquid production plants, desalination plants, or food freezing facilities).

However, it is generally preferred that suitable plants include LNG regasification facilities and LNG receiving terminals, and particularly preferred configurations include those in which LNG is regasified in a process in which at least part of the LNG produces work. Exemplary suitable configurations are described in commonly owned and co-pending international patent application with the title "LIQUEFIED NATURAL GAS REGASIFICATION CONFIGURATION AND METHOD", by John Mak, Curt Graham, and Dave Schulte, which was filed on or about Aug. 13, 2003, and which is incorporated by reference herein. Consequently, and depending on the particular heat source, it should be recognized that the energy needed for regasification of the LNG may be entirely, or only partially provided by contemplated heat sources. Where the heat source provides insufficient quantities of heat to completely gasify the LNG, it should be recognized that supplemental heat may be provided. Suitable supplemental heat sources include waste heat from the steam turbine discharge, condensation duty from the flue gas, ambient heating with air (by providing air conditioning to buildings), with seawater or fuel gas. Consequently, it should be appreciated that contemplated configuration and processes may be used to retrofit existing regasification plants to improve power generation efficiencies and flexibility, or may be used in new installations.

Therefore, it should be recognized that numerous advantages may be achieved using configurations according to the inventive subject matter. For example, contemplated configurations provide a highly efficient LNG power generation cycle that can be coupled with a conventional combined cycle power plant. Furthermore, in most configurations no external heating is needed, and thus eliminates the heretofore present need for fuel gas or seawater to heat the LNG in conventional LNG regasification. In yet a further particularly preferred aspect, it should be appreciated that contemplated configurations (by virtue of modifying the split ratio of the compressed LNG stream) allow processing of LNG with varying compositions and heat contents while producing an "on spec" natural gas and/or LNG transportation fuel for the North American market or other emission sensitive markets.

Moreover, contemplated configurations will produce high-purity ethane as commercial product or as energy source for the combined cycle power plant.

EXAMPLES

Exemplary Calculation of Components in Selected Streams

In the exemplary configuration of a plant as shown in FIG. 2, mol fractions of various components of selected streams were calculated, and the results are listed in. the table below, wherein "LPG" refers to the $C_3+$ bottom fraction of the deethanizer, "pipeline gas" refers to the demethanizer overhead product, and "ethane" refers to the deethanizer overhead product. CNG and LNG motor fuels are extracted from the demethanizer overhead product.

Figure 4:
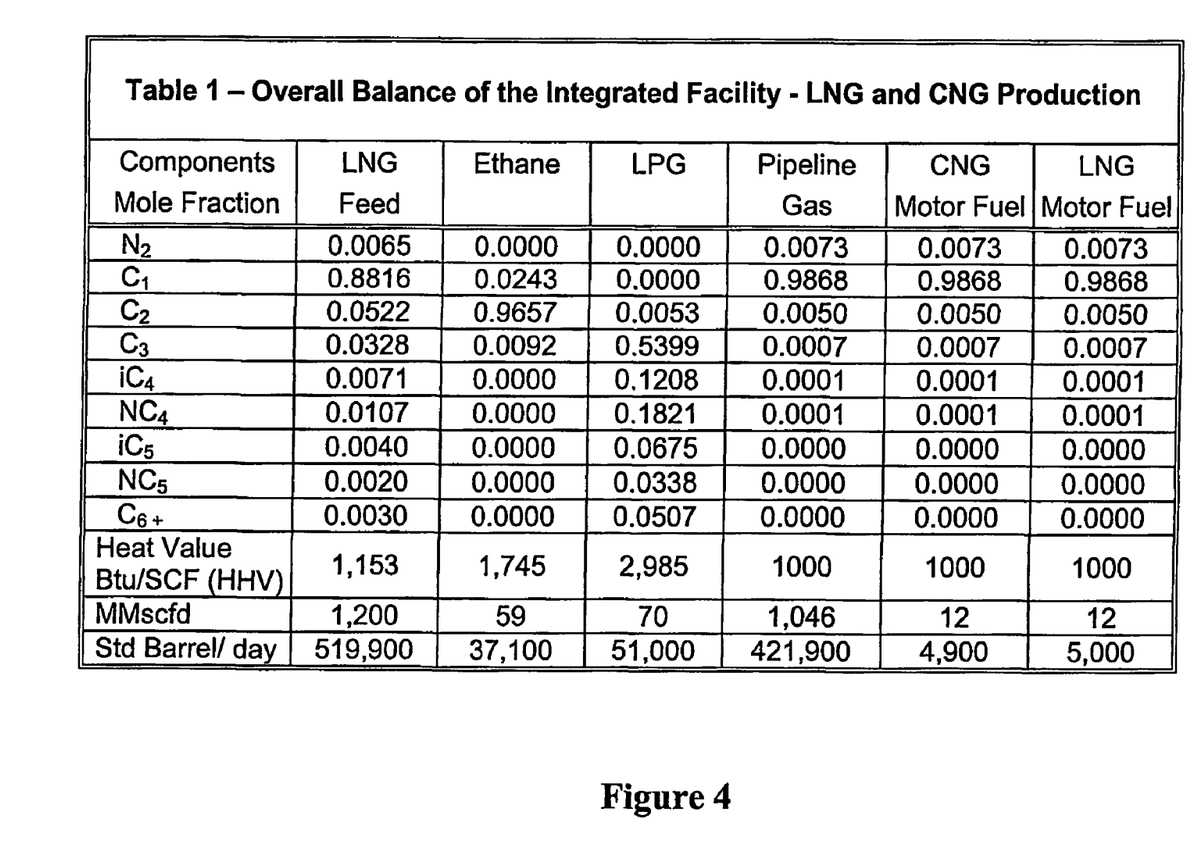
FIG. 4 is a table listing the calculated overall balance of an exemplary integrated facility according to FIG. 2.

Table 1 in FIG. 4 lists the results of the calculations. As can be clearly seen, the methane concentration in the pipeline gas can be significantly increased while specifically rejecting C2 components into the ethane product stream and separating C3+ components into the LPG stream.

Consequently, as viewed from one perspective, the inventors contemplate a regasification plant for liquefied natural gas in which an expander expands a process product of the liquefied natural gas, most preferably comprising demethanizer overhead vapor and/or recycle vapor, to produce work. The term "recycle vapor" as used herein refers to a working fluid of a closed cycle power cycle in at least partially vaporized form, wherein the working fluid is most preferably a lean natural gas (i.e., gas with at least 90 vol % methane).

In another aspect, the inventors contemplate a regasification plant that includes a demethanizer that receives a natural gas and produces an overhead product gas. Suitable plants will further include a first heat exchanger that cools the product gas to produce a product liquid, a pump that increases pressure of at least a portion of the product liquid to form a pressurized product liquid, and a second heat exchanger that vaporizes the pressurized product liquid to form a compressed supercritical product gas. An expander will then expand at least a portion of the compressed supercritical product gas to produce work. As further described above, contemplated plants may additionally include a second expander that extracts work from the natural gas before the natural gas enters the demethanizer (wherein a portion of the overhead product gas is compressed to a pipeline pressure using a compressor that is operationally coupled to the second expander).

In a still further aspect of the inventive subject matter, a plant for regasification of liquefied natural gas may include a first expander that expands a heated and vaporized liquefied natural gas, a second expander that expands a heated and compressed demethanizer overhead to a first pressure (e.g., pipeline pressure of between about 700 psi and 1500 psi), and an optional third expander that further expands the expanded demethanizer overhead to a second pressure (e.g., demethanizer operating pressure of between about 300 psi and 750 psi) below the first pressure, wherein the first, second, and optional third expanders are fluidly coupled to each other and produce work from at least a component of the liquefied natural gas. In such plants, it is generally preferred that a first pump increases pressure of at least a portion of the liquefied natural gas, and wherein the portion of the liquefied natural gas is heated by a heat source (e.g., demethanizer overhead heat exchanger, deethanizer reflux condenser, turbine combustion air intake cooler, flue gas from a gas turbine, waste heat recovery unit, air separation plant, sea water heat exchanger, and/or a fired heater) to form the heated and vaporized liquefied natural gas. Additionally, or alternatively, a first heat exchanger liquefies the demethanizer overhead, a second pump increases pressure of the liquefied demethanizer overhead, and a second heat exchanger heats and vaporizes the pressurized liquefied demethanizer overhead to form the heated and compressed demethanizer overhead.

Thus, specific embodiments and applications of liquefied natural gas regasification configuration and process have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A regasification plant for liquefied natural gas comprising:
    a liquefied natural gas fractionation unit that forms a process product from the liquefied natural gas;
    a cooler and a pump fluidly coupled to the fractionation unit and configured to allow liquefaction and pressurization of the process product to so form a liquefied and pressurized process product;
    a heat source fluidly coupled to the pump and configured to heat the liquefied and pressurized process product to thereby produce a heated process product; and
    wherein at least one component of the fractionation unit uses refrigeration content of the liquefied natural gas, and wherein an expander expands the heated process product to produce work.

2. The regasification plant of claim 1 wherein the process product comprises a demethanizer overhead vapor.

3. The regasification plant of claim 2 wherein the process product further comprises a recycle vapor.

4. The regasification plant of claim 1 wherein the heated process product is a supercritical process product that is expanded in the expander.

5. The regasification plant of claim 3 wherein the recycle vapor comprises the process product after the process product is expanded in the expander.

6. The regasification plant of claim 1 farther comprising a second expander that expands at least a portion of the liquefied natural gas, wherein the portion of the liquefied gas is compressed and heated in a second heat source before expansion in the second expander.

7. The regasification plant of claim 6 wherein the second heat source is at least one of a demethanizer overhead heat exchanger, a deethanizer reflux condenser, a turbine combustion air intake cooler, a flue gas from a gas turbine, a heat recovery unit, air separation plant, a sea water heat exchanger, and a fired heater.

8. The regasification plant of claim 1 further comprising a conduit that allows removal of a portion of the process product from the plant as compressed natural gas, and further comprising another conduit that allows removal of a portion of the liquefied and pressurized process product from the plant as liquefied fuel gas.

9. A liquid natural gas regasification plant, comprising:
    a demethanizer that receives a natural gas and produces an overhead product gas, and a first heat exchanger that cools the product gas to produce a product liquid;
    a pump that increases pressure of at least a portion of the product liquid to form a pressurized product liquid;
    a second heat exchanger that vaporizes the pressurized product liquid to form a supercritical compressed product gas; and
    an expander that expands at least a portion of the supercritical compressed product gas to produce work.

10. The plant of claim 9 further comprising a second expander that extracts work from the supercritical natural gas before the natural gas enters the demethanizer.

11. The plant of claim 10 wherein a portion of the overhead product gas is compressed to a pipeline pressure using a compressor that is operationally coupled to the second expander.

12. The plant of claim 9 wherein the expanded compressed product gas is combined with the overhead product gas.

13. The plant of claim 9 wherein the demethanizer receives heated liquefied natural gas as demethanizer reflux.

14. The plant of claim 13 wherein the first heat exchanger heats liquefied natural gas to form the heated liquefied natural gas.

15. The plant of claim 9 wherein another portion of the compressed product gas is extracted from the plant as compressed natural gas, and wherein another portion of the product liquid is extracted from the plant as liquefied natural gas fuel.

16. A plant for regasification of liquefied natural gas, comprising:
    a first expander fluidly coupled to a demethanizer and configured to expand a heated and supercritical liquefied natural gas to thereby form a demethanizer feed;
    a second expander fluidly coupled to the demethanizer and configured to expand a heated and compressed demethanizer overhead to a first pressure;
    optionally a third expander fluidly coupled to the second expander and configured to further expand the expanded demethanizer overhead to a second pressure below the first pressure; and
    wherein the first, second, and optional third expanders are configured to produce work from at least a component of the liquefied natural gas.

17. The plant of claim 16 wherein a first pump increases pressure of at least a portion of the liquefied natural gas, and wherein the portion of the liquefied natural gas is heated by a heat source to form the heated and supercritical liquefied natural gas.

18. The plant of claim 17 wherein the heat source is at least one of a demethanizer overhead heat exchanger, a deethanizer reflux condenser, a turbine combustion air intake cooler, a flue gas from a gas turbine, a heat recovery unit, a sea water heat exchanger, and a flame heater.

19. The plant of claim 16 wherein a first heat exchanger liquefies a demethanizer overhead, a second pump increases pressure of the liquefied demethanizer overhead, and wherein a second heat exchanger heats and vaporizes the pressurized liquefied demethanizer overhead to form the heated and compressed demethanizer overhead.

20. The plant of claim 19 wherein the first heat exchanger cools the demethanizer overhead using a liquefied natural gas feed as refrigerant.

21. The plant of claim 20 wherein the second heat exchanger heats the pressurized liquefied demethanizer overhead using the expanded demethanizer overhead.

22. The plant of claim 16 wherein the first pressure is a pipeline pressure of between about 700 psi and 1500 psi, and wherein the second pressure is a demethanizer operating pressure of between about 300 psi and 750 psi.

* * * * *